3,299,025
PROCESS FOR ACYLATION OF ALKENYL
AROMATIC POLYMERS
Frederick C. Leavitt, Midland, Mich., and Priscilla A. Carney, Madison, Wis., assignors to The Dow Chemical Company, Midland, Mich., a corporation of Delaware
No Drawing. Filed Feb. 24, 1964, Ser. No. 346,998
13 Claims. (Cl. 260—93.5)

This invention relates to a process for the acylation of alkenyl aromatic polymers. More specifically it relates to a process of acylation of such polymers in a solid state.

Generally, in order to control the degree of acylation and various side reactions, it is necessary to have the material being acylated in solution so as to dilute this reagent and thereby avoid undesired side reactions.

As pointed out in two co-pending applications filed by one of the present inventors, namely co-pending applications Serial No. 198,709, filed May 31, 1962, now U.S. Patent 3,219,644, and Serial No. 221,353, filed September 4, 1962, now abandoned, it is desirable to have pendant vinyl keto groups extending from the aromatic nuclei of an alkenyl aromatic polymer, such as polystyrene. Such vinyl keto groups are desirable for effecting crosslinking and various other post treatments of the alkenyl aromatic polymer. The processes of these co-pending applications are advantageously carried out in solvents, preferably carbon disulfide.

Since the dissolving of the alkenyl aromatic polymer in the solvent and the subsequent removal of the solvent for recovery of the polymeric product involves expensive, time-consuming and often dangerous chemicals, it would be desirable to effect the acylation upon the polymer in the form in which it is available and in which it is often subsequently used. This is particularly desirable in view of the fact that there are only a limited number of solvents in which the acylation can be executed, such as carbon disulfide which is very toxic and relatively expensive.

In accordance with the present invention, it has now been found possible to effect acylation with certain acylating agents by careful control of conditions on an alkenyl aromatic polymer so as to avoid or at least minimize undesirable side reactions such as crosslinking. The acylating agents used in the practice of this invention are either of a type containing a vinyl keto group therein or one containing groups which can be ultimately converted to vinyl keto groups. The acylating agents include acrylyl chloride, methacrylyl chloride, alpha- and beta-chloropropionyl chloride, alpha-chloro and beta-chloro-alpha-methyl-propionyl chloride and the corresponding compounds in which one or both of the chlorine atoms are replaced by bromine, fluorine or iodine.

An important feature of the control of the acylation reaction is the temperature range in which the reaction is effected. By keeping the temperature below 100° C. side reactions from most of the acylating compounds are avoided, or at least considerably minimized. With the more reactive acylating agents, the temperature is desirably kept below 80° C. The acylation will proceed at a temperature as low as 0° C. but it is more practical and faster reaction is effected by starting at at least room temperature. The preferred procedure is to have the reagents at room temperature at the beginning of the reaction and to allow the ambient temperature not to exceed 80° C. preferably not greater than 60° C. Since the reaction is exothermic, it is sometimes necessary to use cooling means to maintain a sufficiently low temperature.

When acrylyl chloride and methacrylyl chloride are used it is generally preferable to use a temperature below 80° C. so as to minimize or avoid polymerization through the unsaturated groups. With the acylating agents which have alpha or beta halogen atoms instead of unsaturation therein, there is the possibility of having alkylation proceed through displacement of the halogen atom other than the acyl halide. This is likewise controlled by maintaining the relatively low temperatures described herein. The temperature desirable for effecting acylation is a lower temperature than the temperature at which alkylation proceeds either through the alpha or beta halogen atom or through the unsaturated group. Therefore, the acylation is selectively permitted by maintaining the temperature below those at which substantial alkylation or polymerization will occur.

The acylation process of this invention comprises the step of passing through a mass of an alkenyl aromatic polymer in dry powder form a vaporized acylation catalyst and a vaporized acylating agent at a temperature in the range of 0–100° C. for period sufficient to effect a substantial amount of acylation of said alkenyl aromatic polymer. The alkenyl aromatic compound used in making the polymer has at least four aromatic nuclear positions unsubstituted.

The vaporized acylation catalyst and vaporized acylating agent is preferably fed into the mass at different inlets so as to have them simultaneously in intimate contact with the polymer at the time they come into contact with each other. However, where there is not substantial reaction between the catalyst and the acylating agent, it is possible to feed the respective vapors through the same inlet or even as a premixture.

Vaporized or gaseous acylation catalysts preferred for use in the practice of this invention are HF, $BF_3$ and $BCl_3$.

Since the boiling point of some of the acylating agents is higher than the temperature desired to avoid the undesired side reactions, vaporization of the acylating agent for the passage of its vapors through the reaction mass can be effected by reducing the pressure sufficiently so that the acylating agent boils at a temperature low enough to be within the desired temperature range. The pressure reduction is effected at a point on the opposite side of the reaction mass from the source of acylating agent so that as the vapors are formed they pass through the reaction mass and effect the acylation. A condenser or cold trap is advantageously placed between the reaction zone and the pressure reducing means so that unreacted acylating agent vapor can be condensed and recovered.

In some cases it is desirable to dilute the acylating vapors with an inert gas such as nitrogen, methane, argon, etc. It is also possible to effect reaction by blowing an inert gas through a liquid acylating agent and thereby pick up enough vapor to pass through the reaction mass without the application of reduced pressure. In such cases it is possible to use the stream of gas as an agitating means to keep the reaction mixture in gas suspension.

The alkenyl aromatic preformed polymers used as the starting material for attachment of the above pendant groups by the acylation described herein are represented by the formula

wherein R″ represents hydrogen and lower alkyl groups, preferably methyl, ethyl, etc. Therefore, the starting polymer has a plurality of repeating units therein of the formula

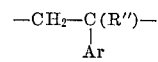

Polystyrene is preferred in the practice of this invention, but other polymers of alkenyl aromatic compounds can be used, preferably those in which the aromatic ring has no substitution or a small amount of substitution, in addition to the alkenyl group. Other substituents on the aromatic ring can include, but are not limited to, various aliphatic, cycloaliphatic and aromatic hydrocarbon groups, preferably of no more than about 8 carbon atoms, halogen, e.g. Cl, F, Br and I, etc.

Typical alkenyl aromatic compounds that can be used include, but are not restricted to, polymers of the following: styrene, α-methylstyrene, α-ethylstyrene, various derivatives of styrene having the substituent groups attached to the aromatic nucleus, such as methyl styrene, ethyl styrene, propyl styrene, butyl styrene, heptyl styrene, octyl styrene, and the corresponding derivatives of α-methyl styrene, α-ethyl styrene, etc., chloro styrene, cyanomethyl styrene, etc., preferably with the nuclear substituent group of the preceding compounds in a position other than para to the alkenyl group, vinyl naphthalene, isopropenyl naphthalene, vinyl methyl naphthalene, vinyl ethyl naphthalene, vinyl dimethyl naphthalene, vinyl hexyl naphthalene, vinyl diethyl naphthalene, isopropenyl diphenyl, vinyl methyl diphenyl, vinyl butyl diphenyl, vinyl chloro naphthalene, vinyl cyano naphthalene, vinyl cyanoethyl naphthalene, isopropenyl bromo naphthalene, vinyl chloro diphenyl, isopropenyl cyano diphenyl, isopropenyl fluoro diphenyl, etc.

As indicated above, various copolymers of alkenyl aromatic compounds are also included for use in the practice of this invention. In such cases it is desirable to have at least 5% of the alkenyl aromatic monomer contained in the copolymer so as to provide sufficient aromatic nuclei which can be acylated to provide a desired amount of crosslinking groups, preferably at least 20%, particularly where the comonomer may have substituents therein which retard or interfere with the acylation. In some cases it may be desirable to use copolymers of one alkenyl aromatic group having no substituents or no more than one substituent on the aromatic nucleus, and as the comonomer an alkenyl aromatic monomer having a high degree of substitution thereon, in which case the latter monomer does not have positions easily available for acylation. In such case, it is desirable to use copolymers of monomer mixtures having at least 5% of the unsubstituted or substituted alkenyl aromatic compound having one substituent group other than the alkenyl group.

Generally, however, it is preferred to use at least 20% of an alkenyl aromatic compound having a number of positions available for acylation even though it is not intended, or possibly desired, to substitute an acyl group on each of such nuclei.

In addition to various alkenyl aromatic compounds having a high degree of substitution thereon of the groups indicated above, it is also desirable in many cases to use other modifying comonomers in conjunction with the unsubstituted or monosubstituted alkenyl aromatic compounds. Preferred comonomers are those which are not reactive with or reacted on by the acylation catalyst. Typical preferred comonomers, in addition to the various alkenyl aryl compounds listed above are ethylene, propylene, butenes, butadiene, isoprene, vinyl ethyl ether, acrylonitrile, methyl methacrylate, etc.

Molecular weights of no less than 3000 are generally preferred, although in some cases where a high degree of acylation is to be effected with the result that the molecular weight will be multiplied considerably upon crosslinking, even a lower molecular weight can often be used. There is no upper limit on the molecular weight of the polymers that can be used. With higher molecular weights such as 150,000 or higher, the number of acyl groups to be introduced to produce insolubility and infusibility upon crosslinking, is obviously much smaller than is the case where lower molecular weight polymers are used.

While it is generally preferred to have a linear, soluble polymer as the preformed starting polymer, it is also desirable in some cases to apply the present invention to crosslinked, insoluble polymers where it is desired to effect the substitution of vinyl keto groups on a limited portion of the starting polymer. For example, beads, pellets, and particles of such crosslinked, insoluble polymers can be used and the acylation and dehydrohalogenation reactions effected on the surface of the beads, pellets, particles or other shape of the starting polymer. Typical crosslinked insoluble polymers which can be used for this purpose are those polymers of alkenyl aromatic compounds as listed above, which have been copolymerized with minor amounts of difunctional monomers such as divinyl benzene, divinyl toluene, divinyl naphthalene, divinyl diphenyl, diisopropenyl benzene, ethylene glycol diacrylate, divinyl diphthalate, etc.

In order to have the alkylation substantially uniformly distributed throughout the polymer, it is sometimes advantageous to have a plurality of inlets distributed in the reaction zone so as to effect uniform distribution of the vapors throughout the polymer mass. Another manner of effecting uniform alkylation is to have a loose bed of the polymer powder and to keep the powder in fluid suspension by passing the respective vapors into the powder at a sufficient velocity to keep the polymer powders in suspension. This method of suspending the polymer particles assures intimate and uniform mixture of the three reagents.

The following examples illustrate the practice of this invention but are not intended to restrict in any way the scope or the manner in which the invention can be practiced. Parts and percentages are by weight.

*Example I*

Two parts of finely powdered polystyrene of a molecular weight of 100,000 is placed in a vertical tube made of lead (or other material resistant to reaction with HF) with three gas inlets feeding into the lower end of the tube. The length of the tube is sufficient to allow approximately five times the free space above the polymer particles as is occupied by the mass of powdered polymer when the latter is at rest. An outlet tube is located at the upper end of the reactor tube. Streams of nitrogen, anhydrous HF vapor and acrylyl chloride vapor, respectively, are fed simultaneously into the three tubes. The HF and the acrylyl chloride are fed in at approximately a mole per mole rate and the rate of the nitrogen feed is sufficient to maintain the powdered mass in fluid suspension as can be predetermined by pretesting with the same amount of powder in a glass tube. After approximately 20 minutes, the vapor flow is discontinued and the polymer removed from the column and placed in the dilute solution of ice-cold aqueous HCl. After the resulting mixture is slurried for several minutes, the polymer powder is filtered off and dried. An I.R. spectra of the product shows a strong carbonyl peak at 5.9. The peak intensity D.S. is more than 15. D.S. is defined as the number of substituents per 100 monomer units.

*Example II*

The procedure of Example I is repeated without nitrogen flow and with corresponding increase in the feed rate of the other two streams so as to maintain the powder in suspension. Satisfactory acylation is also obtained.

*Example III*

The procedure of Example I is repeated a number of times and in place of the polystyrene equivalent amounts of the following polymers respectively are used: polyvinyl toluene, α-methyl styrene, vinyl naphthalene, o-chloro styrene, meta-cyanomethyl styrene, vinyl ethyl naphthalene, vinyl diphenyl, 50–50 copolymer of styrene-α-methyl styrene, 50–50 styrene-vinyl toluene, and 50–50 styrene-ethylene. In each case satisfactory acylation is effected. Upon exposure to high energy radiation, as well as to free radical generating catalysts, namely peroxy compounds, etc., such as, for example, benzoyl peroxide, t-Bu hydroperoxide, di-t-Bu diperphthalate, t-Bu perbenzoate, etc., the respective products are crosslinked to hard, insoluble, infusible masses.

Example IV

The procedure of Example I is repeated, using in place of the acrylyl chloride, an equivalent amount of α-chloro propionyl chloride, β-chloro propionyl chloride, α-bromo propionyl bromide, β-fluoro propionyl chloride, α-iodo propionyl chloride, and β-fluoro propionyl bromide, respectively. In each case, acylation is satisfactorily effected. Each acylated product is subsequently dehydrohalogenated by reaction with potassium acetate to give the corresponding acrylyl derivative which is eventually crosslinked to an insoluble infusible product as in Example III.

Example V

The procedures of Examples I–IV are repeated using anhydrous BF₃ in place of the HF. Similar results are obtained.

Example VI

The procedures of Examples I–IV are repeated using anhydrous BCl₃ in place of the HF. Similar results are obtained.

The polymer derivatives in which the acylated product still contains chlorine or other halogen, for example in the alpha or beta position of the propionyl group either because of the starting material or because of halogen addition during the reaction, can be converted to vinyl keto groups by treatment with potassium acetate as indicated in Example IV to give the corresponding acrylyl derivative.

Preferred acylating agents for the practice of this invention are the acrylyl halides and the alpha and beta-halo propionyl halides. These can be represented by the formulas:

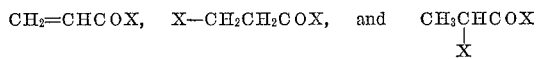

The X represents a halogen atom, namely chlorine, bromine, iodine, or fluorine. The compounds having two halogen atoms can have identical or different halogen atoms. Preferably the halogen is chlorine or bromine.

Some of these acylating agents are commercially available, but all of them can be prepared easily by well known reactions. For example, the various acrylyl halides can be prepared by conversion of acrylic acid to the corresponding acrylyl halide by reaction with an inorganic acid halide such as thionyl halide, e.g., thionyl chloride, etc. The acylating agents having two halogen atoms therein can be prepared either by starting with the α- or β-halogen-propionic acid and converting its acid group to the acid halide as described, or an acrylyl acid halide can be converted to α- or β-halogen-substituted propionyl halide. For example, the β-halogen substituted propionyl halide is prepared by HX addition to an acrylyl halide. The α-halogen substituted derivatives are prepared by direct halogenation of the corresponding propionyl halide.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:
1. The process for solvent-free acylation of an aromatic polymer comprising the steps of passing simultaneously through a mass of solid, powdered aromatic polymer:
   (a) an acylating agent in vapor form, having a formula selected from the class consisting of

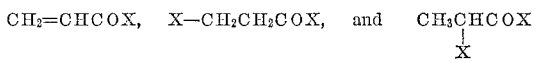

wherein X represents a halogen atom; and
   (b) an acylation catalyst in vapor form selected from the class consisting of hydrogen fluoride, boron chloride and boron fluoride;
said vapors being allowed to come into intimate contact with each other and with said polymer powder at temperatures ranging from 0–100° C. for a period sufficient to effect acylation of said aromatic polymer, said aromatic polymer being selected from the class consisting of polymers of an alkenyl aromatic compound having at least four aromatic nuclear positions unsubstituted.

2. The process of claim 1 in which said temperature is in the range of 20–80° C.

3. The process of claim 1 in which said temperature is in the range of 20–60° C.

4. The process of claim 1 in which said polymer is polystyrene.

5. The process of claim 4 in which said powdered acylation catalyst is anhydrous hydrogen fluoride.

6. The process of claim 4 in which said acylation catalyst is anhydrous boron trichloride.

7. The process of claim 4 in which said acylation catalyst is anhydrous boron trifluoride.

8. The process of claim 1 in which the said acylation catalyst is anhydrous hydrogen fluoride.

9. The process of claim 1 in which said acylation catalyst is anhydrous boron trichloride.

10. The process of claim 1 in which said acylation catalyst is anhydrous boron trifluoride.

11. The process of claim 1 in which said polymer is polystyrene, said acylation catalyst is anhydrous hydrogen fluoride, and said temperature is in the range of 20–80° C.

12. The process of claim 1 in which said polymer is polystyrene, said acylation catalyst is anhydrous boron trichloride, and said temperature is in the range of 20–80° C.

13. The process of claim 1 in which said polymer is polystyrene, said acylation catalyst is anhydrous boron trifluoride, and said temperature is in the range of 20–80° C.

References Cited by the Examiner
UNITED STATES PATENTS

| | | | |
|---|---|---|---|
| 1,898,687 | 2/1933 | Rice | 260—691 |
| 2,566,302 | 9/1951 | Allen | 260—93.5 |
| 2,642,398 | 6/1953 | Butler | 260—93.5 |

JOSEPH L. SCHOFER, *Primary Examiner.*

J. A. SEIDLECK, *Assistant Examiner.*